US007729708B2

(12) United States Patent
Jung et al.

(10) Patent No.: US 7,729,708 B2
(45) Date of Patent: Jun. 1, 2010

(54) METHOD AND SYSTEM FOR INTERACTIVE MAPPING TO PROVIDE GOAL-ORIENTED INSTRUCTIONS

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 910 days.

(21) Appl. No.: 11/047,465

(22) Filed: Jan. 31, 2005

(65) Prior Publication Data

US 2006/0171308 A1 Aug. 3, 2006

(51) Int. Cl.

| | |
|---|---|
| ***H04W 24/00*** | (2009.01) |
| ***G01C 21/00*** | (2006.01) |
| ***G01C 21/32*** | (2006.01) |
| ***F41G 9/00*** | (2006.01) |
| ***H04H 20/71*** | (2008.01) |

(52) U.S. Cl. .................... 455/456.3; 701/202; 701/204; 701/210; 701/211; 701/302; 370/312

(58) Field of Classification Search ................. 370/254, 370/252, 445, 328; 701/201
See application file for complete search history.

(56) References Cited

U.S. PATENT DOCUMENTS

| | | | |
|---|---|---|---|
| 4,301,506 | A | 11/1981 | Turco |
| 4,528,552 | A | 7/1985 | Moriyama et al. |
| 4,546,439 | A | 10/1985 | Esparza |
| 4,570,227 | A | 2/1986 | Tachi et al. |
| 4,646,089 | A | 2/1987 | Takanabe et al. |
| 4,734,863 | A | 3/1988 | Honey et al. |
| 4,764,873 | A | 8/1988 | Libby |
| 4,796,189 | A | 1/1989 | Nakayama et al. |
| 4,866,626 | A | 9/1989 | Egli |
| 4,876,651 | A | 10/1989 | Dawson et al. |

(Continued)

OTHER PUBLICATIONS

Jonathan W. Lowe, "Raster-Oriented Technology Supports Public Internet Applications That Manage Large Raster Collections," Geospatial Solutions (Oct. 2004) (4 pages).

(Continued)

*Primary Examiner*—Daniel J Ryman
*Assistant Examiner*—Cassandra Decker
(74) *Attorney, Agent, or Firm*—Lee & Hayes, PLLC

(57) ABSTRACT

Provided is a computer system and methods for directing mobile peer devices. A method includes receiving an itinerary identifying one or more goals for the peer devices; receiving a priority associated with the itinerary, the priority identifying at least one goal of the one or more goals, the priority listing the at least one goal in order of importance; determining a routing in accordance with the itinerary and the priority; and broadcasting the routing. A computer system includes a routing module coupled to a memory configurable to determine a routing based on priorities and itinerary goals; a receiver coupled to a processor configurable to receive the priorities and the itinerary goals from at least two peer devices over a wireless connection; and a transmitter coupled to the processor configurable to broadcast the routing to the peer devices, the routing configurable to direct the peer devices.

31 Claims, 6 Drawing Sheets

U.S. PATENT DOCUMENTS

| | | | |
|---|---|---|---|
| 4,890,104 | A | 12/1989 | Takanabe et al. |
| 4,914,605 | A | 4/1990 | Loughmiller et al. |
| 4,926,336 | A | 5/1990 | Yamada |
| 4,937,753 | A | 6/1990 | Yamada |
| 4,954,958 | A | 9/1990 | Savage et al. |
| 4,962,458 | A | 10/1990 | Verstraete |
| 4,984,168 | A | 1/1991 | Neukrichner et al. |
| 5,031,104 | A | 7/1991 | Ikeda et al. |
| 5,041,983 | A | 8/1991 | Nakahara et al. |
| 5,067,081 | A | 11/1991 | Person |
| 5,115,399 | A | 5/1992 | Nimura et al. |
| 5,168,452 | A | 12/1992 | Yamada et al. |
| 5,170,353 | A | 12/1992 | Verstraete |
| 5,172,321 | A | 12/1992 | Ghaem et al. |
| 5,189,430 | A | 2/1993 | Yano et al. |
| 5,191,406 | A | 3/1993 | Brandestini et al. |
| 5,191,532 | A | 3/1993 | Moroto et al. |
| 5,231,584 | A | 7/1993 | Nimura et al. |
| 5,270,937 | A | 12/1993 | Link et al. |
| 5,274,387 | A | 12/1993 | Kakihara et al. |
| 5,293,163 | A | 3/1994 | Kakihara et al. |
| 5,802,526 | A | 9/1998 | Fawcett et al. |
| 5,844,570 | A | 12/1998 | Curtright et al. |
| 5,884,262 | A | 3/1999 | Wise et al. |
| 5,948,040 | A * | 9/1999 | DeLorme et al. ............ 701/201 |
| 6,009,403 | A * | 12/1999 | Sato ............................. 705/6 |
| 6,084,882 | A | 7/2000 | Ogura et al. |
| 6,104,790 | A | 8/2000 | Narayanaswami |
| 6,119,095 | A * | 9/2000 | Morita .......................... 705/5 |
| 6,240,360 | B1 | 5/2001 | Phelan |
| 6,282,489 | B1 | 8/2001 | Bellesfield et al. |
| 6,321,158 | B1 | 11/2001 | DeLorme et al. |
| 6,347,299 | B1 | 2/2002 | Holzman et al. |
| 6,381,534 | B2 | 4/2002 | Takayama et al. |
| 6,493,428 | B1 | 12/2002 | Hillier |
| 6,496,842 | B1 | 12/2002 | Lyness |
| 6,498,982 | B2 | 12/2002 | Bellesfield et al. |
| 6,532,415 | B2 * | 3/2003 | Nishikawa .................. 701/200 |
| 6,542,593 | B1 | 4/2003 | Bowman-Amuah |
| 6,553,309 | B2 | 4/2003 | Uchida et al. |
| 6,570,595 | B2 | 5/2003 | Porter |
| 6,636,803 | B1 | 10/2003 | Hartz, Jr. et al. |
| 6,680,999 | B1 | 1/2004 | Garcia |
| 6,718,017 | B1 | 4/2004 | Price et al. |
| 6,728,731 | B2 | 4/2004 | Sarukkai et al. |
| 6,731,625 | B1 | 5/2004 | Eastep et al. |
| 6,801,604 | B2 | 10/2004 | Maes et al. |
| 6,816,779 | B2 | 11/2004 | Chen et al. |
| 6,826,474 | B2 | 11/2004 | Miyahara et al. |
| 6,839,023 | B1 | 1/2005 | Benco et al. |
| 6,868,333 | B2 * | 3/2005 | Melen ........................ 701/200 |
| 7,058,507 | B2 * | 6/2006 | Saiki .......................... 701/207 |
| 7,236,173 | B2 | 6/2007 | Chithambaram et al. |
| 7,292,935 | B2 * | 11/2007 | Yoon .......................... 701/209 |
| 2002/0174003 | A1 * | 11/2002 | Redmann et al. ............... 705/8 |
| 2003/0134648 | A1 * | 7/2003 | Reed et al. .................. 455/456 |
| 2004/0015293 | A1 * | 1/2004 | Randazzo et al. ........... 701/213 |
| 2004/0054428 | A1 * | 3/2004 | Sheha et al. .................. 700/56 |
| 2004/0172192 | A1 * | 9/2004 | Knutson ..................... 701/208 |
| 2004/0193707 | A1 | 9/2004 | Alan et al. |
| 2004/0217884 | A1 | 11/2004 | Samadani et al. |
| 2004/0224703 | A1 | 11/2004 | Takaki et al. |
| 2004/0254723 | A1 | 12/2004 | Tu |
| 2005/0032556 | A1 * | 2/2005 | Bennett et al. .............. 455/574 |
| 2005/0072116 | A1 * | 4/2005 | Bunte ........................ 52/782.1 |
| 2005/0102099 | A1 | 5/2005 | Linn |
| 2005/0102245 | A1 * | 5/2005 | Edlund et al. ................. 705/80 |
| 2005/0131643 | A1 * | 6/2005 | Shaffer et al. ............... 701/210 |
| 2006/0040670 | A1 * | 2/2006 | Li et al. ...................... 455/445 |
| 2006/0058948 | A1 | 3/2006 | Blass et al. |
| 2006/0168592 | A1 * | 7/2006 | Andrews et al. ............ 719/318 |

OTHER PUBLICATIONS

Joachim Bobrich, et al., "Augented Maps," Symposium on Geospatial Theory, Processing and Applications; Univ. of Hanover, 2002.

Gluck, Myke, Ph.D., et al., "Augemented Seriation: Usability of a Visual and Auditory Tool for Geographic Pattern Discovery wth Risk Perception Data," GeoComputation 1999; p. 1.

Introduction to Augmented Reality; www.se.rit.edu/-jrv/research/ar/introction.html; printed Dec. 15, 2004; 11 pages.

Seattle Area Traffic Home, web page, Dec. 10, 2004, 11:14 A.M., www.wsdot.wa.gov/traffic/seattle.

Hall, T. Brett et al., "A Novel Interactivity Environment for Integrated Intelligent Transportation and Telematic Systems", 5th Intl. IEEE Conf., Singapore, Sep. 3, 2002.

U.S. Appl. No. 11/124,626, Jung et al.

U.S. Appl. No. 11/058,399, Jung et al.

U.S. Appl. No. 11/066,112, Jung et al.

U.S. Appl. No. 11/050,642, Jung et al.

U.S. Appl. No. 11/086,973, Jung et al.

U.S. Appl. No. 11/998,450, Jung et al.

U.S. Appl. No. 11/998,827, Jung et al.

U.S. Appl. No. 11/998,871, Jung et al.

U.S. Appl. No. 12/231,314, Jung et al.

U.S. Appl. No. 12/231,325, Jung et al.

Espatial: iSMART Overview; www.espatial.com/page455.html bearing a date of Feb. 8, 2005 (3 pp.).

* cited by examiner

METHOD AND SYSTEM FOR INTERACTIVE MAPPING TO PROVIDE GOAL-ORIENTED INSTRUCTIONS

TECHNICAL FIELD

The present application relates generally to maps.

SUMMARY

In one aspect, a method includes but is not limited to receiving an itinerary identifying one or more goals for the at least two peer devices; receiving a priority associated with the itinerary, the priority identifying at least one goal of the one or more goals, the priority listing the at least one goal in order of importance; determining a routing in accordance with the itinerary and the priority; and broadcasting the routing to direct the at least two peer devices. In addition to the foregoing, other method aspects are described in the claims, drawings, and text forming a part of the present application.

In one aspect, another method for a mobile peer device to receive routing in real time to provide a route for the mobile peer device to follow an itinerary includes but is not limited to connecting with a decision-making device; transmitting real-time location data of the mobile peer device to the decision-making device; downloading the route from the decision-making device, the route determined from the real-time location data of the mobile peer device and from real-time location data of at least one or more other mobile peer devices; and displaying instructions for enabling the mobile peer device to meet a predetermined goal in accordance with the itinerary.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In one aspect, a method for a mobile peer device to receive routing in real time to provide a route for the mobile peer device to follow an itinerary includes but is not limited to: connecting with a decision-making device; transmitting real-time location data of the mobile peer device to the decision-making device; and downloading the route from the decision-making device, the route determined from the real-time location data of the mobile peer device and from real-time location data of at least one or more other mobile peer devices; and displaying instructions for enabling the mobile peer device to meet a predetermined goal in accordance with the itinerary. In addition to the foregoing, other method aspects are described in the claims, drawings, and text forming a part of the present application.

In one aspect, a computer system includes but is not limited to a processor; a memory coupled to the processor; a routing module coupled to the memory, the routing module configurable to determine a routing based on one or more priorities and one or more itinerary location possibilities; a receiver coupled to the processor, the receiver configurable to receive the one or more priorities and the one or more itinerary location possibilities from at least two peer devices over a wireless connection; and a transmitter coupled to the processor, the transmitter configurable to broadcast the routing to the at least two peer devices, the routing configurable to direct the at least two peer devices. In addition to the foregoing, other computer system aspects are described in the claims, drawings, and text forming a part of the present application.

In one aspect, a computer program product is provided including but not limited to a computer readable medium configurable to perform one or more acts for directing a plurality of peer devices, the one or more acts including but not limited to: receiving an itinerary identifying one or more goals for the plurality of peer devices; receiving a priority associated with the itinerary, the priority identifying at least two of the one or more goals in order of importance; determining a routing in accordance with the itinerary and the priority; and broadcasting the routing to direct the at least two peer devices. In addition to the foregoing, other program product aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE FIGURES

A better understanding of the subject matter of the present application can be obtained when the following detailed description of the disclosed embodiments is considered in conjunction with the following drawings, in which.

DETAILED DESCRIPTION

Those with skill in the art will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
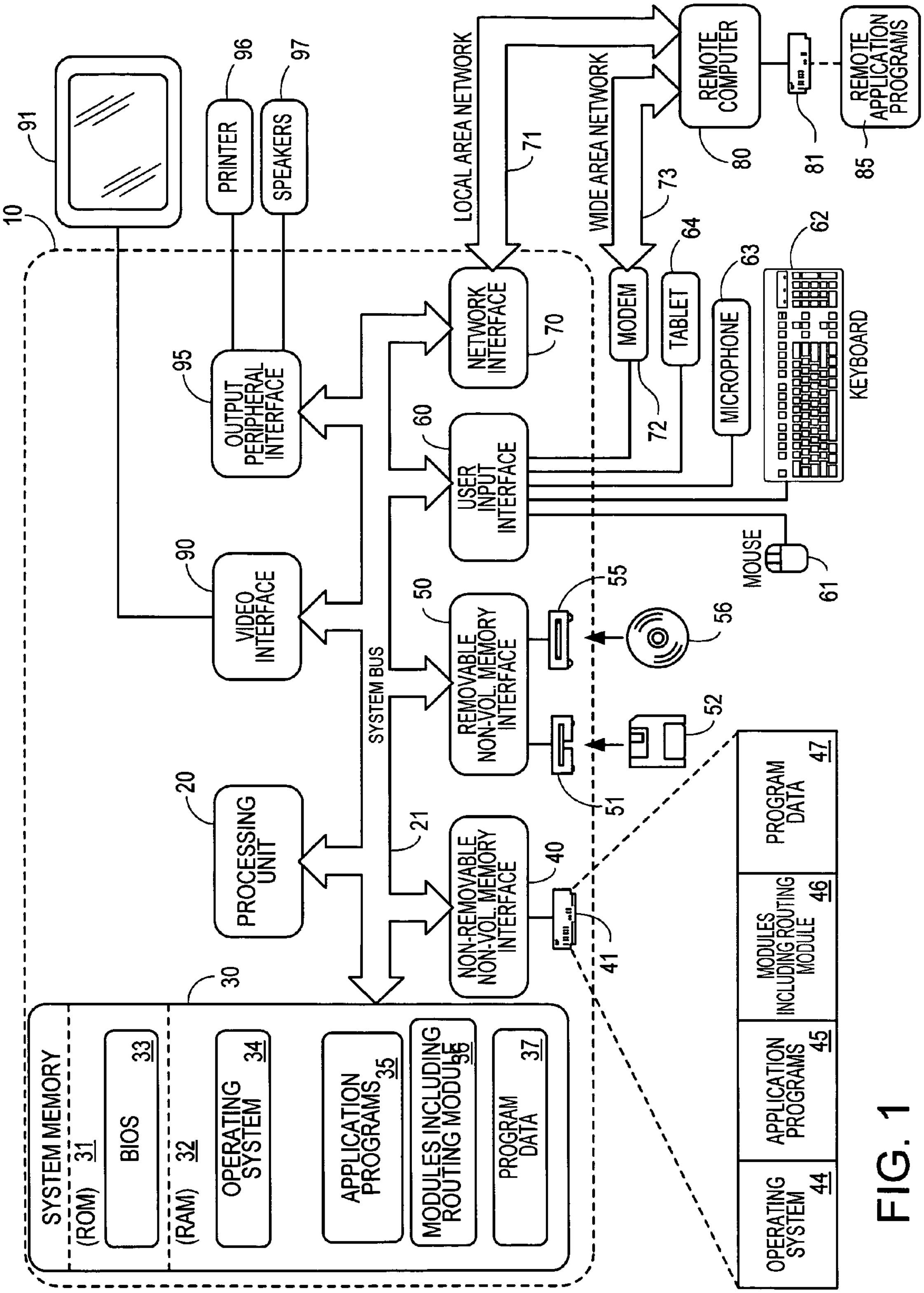
FIG. 1 is a block diagram of an exemplary computer architecture that supports the claimed subject matter.

With reference to FIG. 1, an exemplary computing system for implementing the embodiments includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36 and program data 37. FIG. 1 is shown with program modules 36 including a queuing module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules 46 and program data 47. Program modules 46 is shown including a queuing module, which can be configured as either located in modules 36 or 46, or both locations, as one with skill in the art will appreciate. Note that these components can either be the same as or different from operating system 34, application programs 35, other program modules 36, and program data 37. Operating system 44, application programs 45, other program modules 46, and program data 47 are given different numbers hereto illustrate that, at a minimum, they are different copies. A user may enter commands and information into the computer 10 through input devices such as a tablet, or electronic digitizer 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the present subject matter will be described with reference to acts and symbolic representations of operations that may be performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the present subject matter is being described in the foregoing context, it is not meant to be limiting as those of skill in the art will appreciate that some of the acts and operation described hereinafter can also be implemented in hardware.

Figure 2:
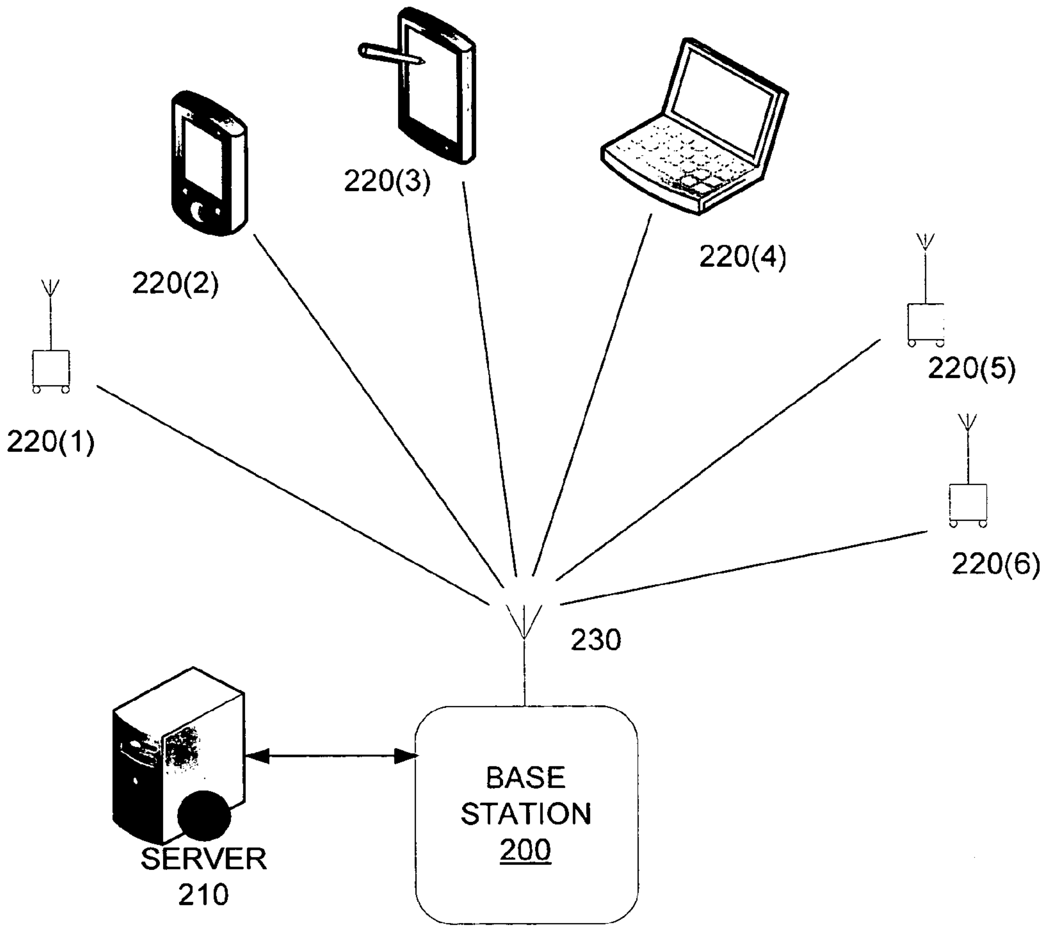
FIG. 2 is a block diagram of a wireless computer environment appropriate for embodiments of the subject matter of the present application.

Referring to FIG. 2, a diagram of a wireless network appropriate for embodiments herein is shown. The wireless network includes a base station 200, which can be coupled to a server 210, internally to server 210 or externally to server 210. Base station 200 interacts with a plurality of wireless mobile peer devices 220, which can be receivers only, designed to receive a real time map and directions determined at server 210. Mobile peer devices interact with base station 200 via wireless connection 230. The wireless connection 230 could include a wireless local area network connection (WLAN), a radio frequency (RF) connection, infrared or other method of wireless communication of data, such as a satellite connection or the like as one of skill in the art with the benefit of the present disclosure will appreciate. Other wireless connections can include Global Positioning Systems (GPS) and location detection systems that include tracking tags and the like. Other wireless methods appropriate for embodiments herein could include IEEE 802.11 or Bluetooth type wireless environments.

Mobile peer devices 220 can include receivers and transmitters to interact with server 210. Mobile peer devices 220 are shown including different types of mobile peer devices, including mobile peer devices 220(1) which could be a simple device capable of only receiving and displaying data. The data could include written directions or include a map or both. Component 220(2) is shown as a personal electronic assistant, which could be configured to both send and/or receive data, display maps and/or directions as generated by server 210. Component 220(3) is shown as a tablet personal computer (PC) which can also be configured to both send and/or receive data. Component 220(4) is shown as a laptop or notebook computer which can also send and/or receive data and/or directions. Mobile peer devices 220(5) could be implemented as a simple mobile device which could be configured to receive and display simple commands in real time. Component 220(6) could be implemented as a cellular telephone or pager and include a display configured to show a map and directions in accordance with embodiments herein. In an embodiment, each of mobile peer devices 220 are peer devices, or each of mobile peer devices 220 are in a subset of peer devices. More particularly, embodiments are directed to including two or more mobile peer devices 220 as peers benefiting from same goal-oriented instructions with respect to projected locations. The locations could be displayed on each component 220.

Figure 3:
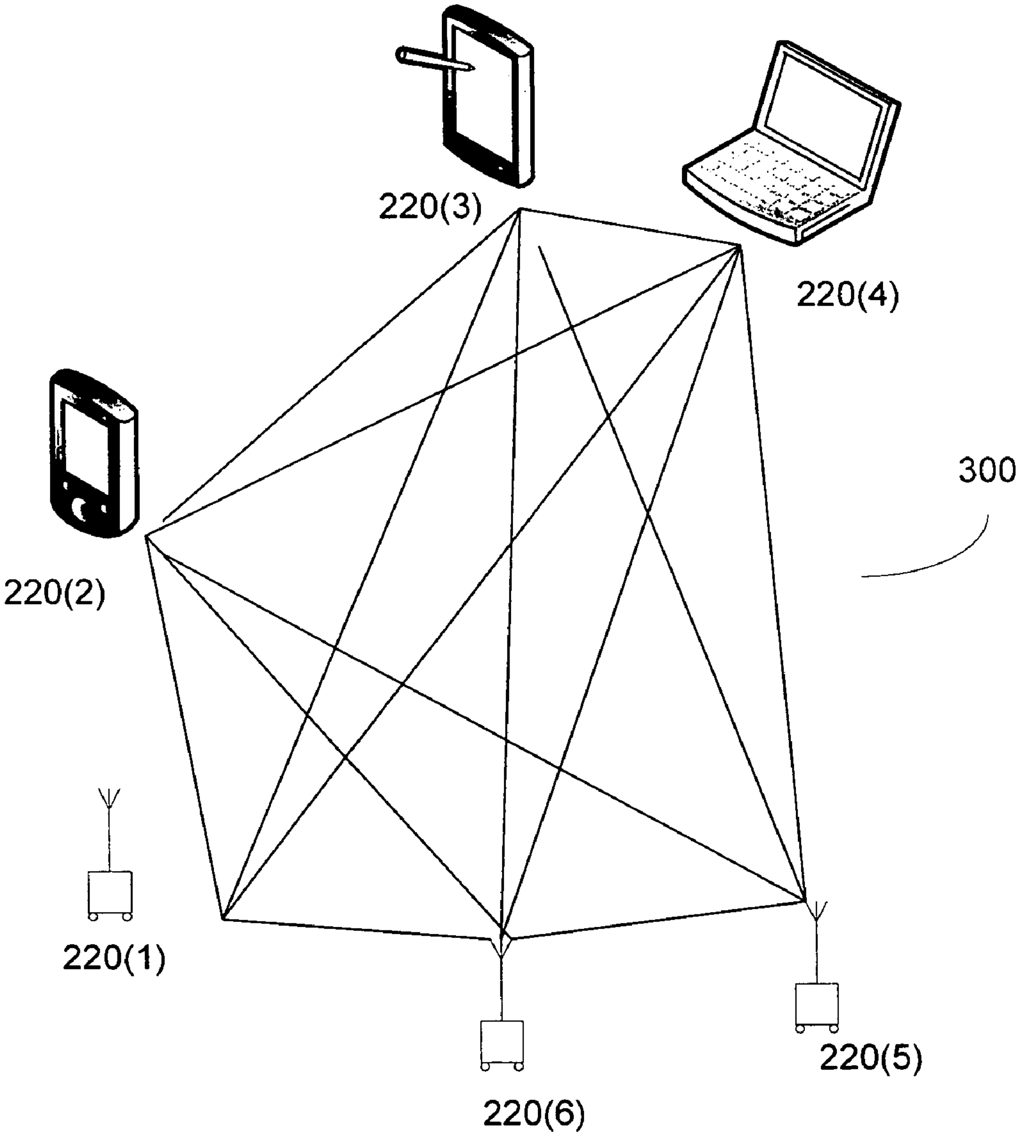
FIG. 3 is a block diagram of a wireless mesh network of mobile peer devices appropriate for embodiments of the subject matter of the present application.

Referring now to FIG. 3, a block diagram illustrates a configuration wherein mobile peer devices 220 are each part of a mesh network 300 wherein one or more of the mobile peer devices 220 can operate as a server to direct the other mobile peer devices 220. Alternatively, mobile peer devices 220 can be configured to use the mesh network 300 as a negotiation network wherein a voting protocol is used to determine which goal the mobile peer devices 220 should meet. The mobile peer devices 220 can have a voting control hierarchy to determine which goal should be followed by the mobile peer devices 220 if several goals are presented as options. One of skill in the art with the benefit of this disclosure will appreciate that there are several appropriate negotiation network types for a mobile peer mesh network 300 and the choice can be according to system requirements. The mesh network 300 can be configured such that one or more of the mobile peer devices 220 are decision-making devices. For example, notebook computer 220(4) could be designated as a decision-making device for the peer mesh network 300. If notebook computer 220(4) is out-of-range of the peer devices, a hierarchy of devices could be provided such that tablet PC 220(3) could be a default decision-making device if notebook computer 220(4) is not capable of interacting with the mesh network.

Figure 4:
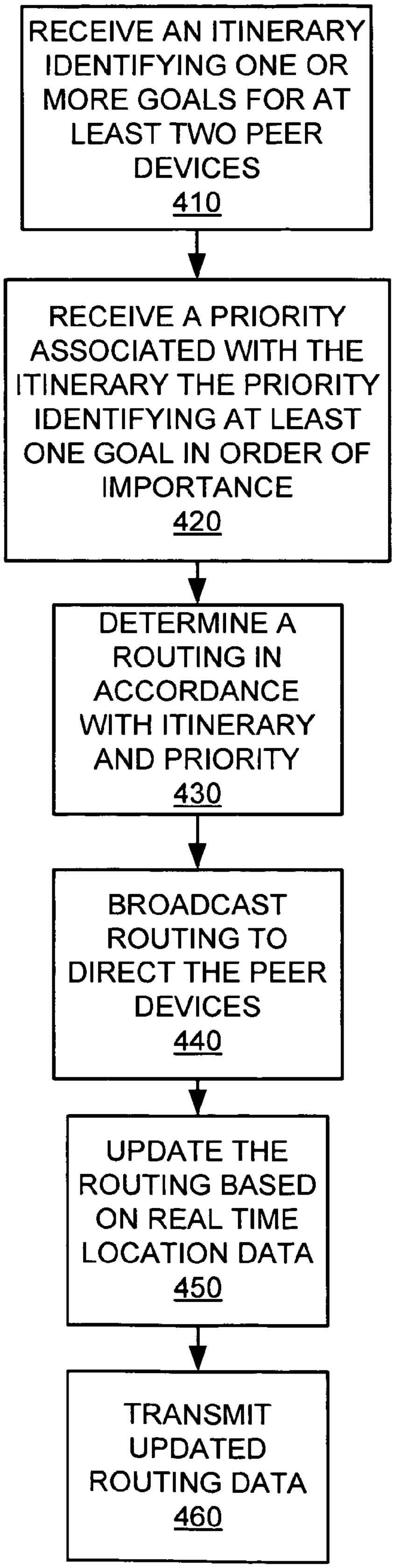
FIG. 4 is a flow diagram illustrating a method in accordance with an embodiment of the subject matter of the present application.

Referring now to FIG. 4, a flow diagram illustrates a method in accordance with an embodiment, in which the mobile peer devices 220 wirelessly connected to the base station 200 and server 210 are coupled to receive data from mobile peer devices 220. More particularly, the embodiment is directed to determining projected locations and goal-oriented instructions for a peer group. Thus, for example, a peer group in a predetermined area could separate for a predetermined amount of time and have a decision-making device, such as server 210, a predetermined mobile peer device of mobile peer devices 220, or the like, direct the peer devices in the peer group to locations that insure that the peer group will be readily available for meeting or the like at a predetermined time. Further, the instructions received can allow for real-time alterations to take place by tracking the peer group, monitoring a relative success against an itinerary and notifying the peer group if any changes are required. The monitoring can further include developing an itinerary based on the monitoring of real-time location data and providing updates or additional itinerary data to the peer group.

Block 410 provides for receiving an itinerary identifying one or more goals to be met by at least two of the mobile peer devices. The one or more goals can be either times, places or other goals, such as a goal of reaching a certain number of locations within a certain amount of time, or reaching certain destinations in a particular order or the like. Thus, for purposes of the present disclosure, itinerary can mean stated location goals, time and location goals, timing goals or any intention without firm predetermined location and timing. For example, an itinerary could include a plan to meet within in a certain city on a certain day for the peer group without any predetermined specific location or time parameters for the day provided. In this context, the itinerary could be understood to be subject to further alteration, amendments via a decision-making process, such as those described herein.

Block 420 provides for receiving a priority associated with the itinerary, the priority identifying at least one of the one or more goals in order of importance. Block 430 provides for determining a routing in accordance with itinerary and priority. Block 440 provides for broadcasting the routing to direct the peer devices, which include at least two peer devices. Block 450 provides for updating the routing based on real-time location data. Block 460 provides transmitting the updated routing data.

Figure 5:
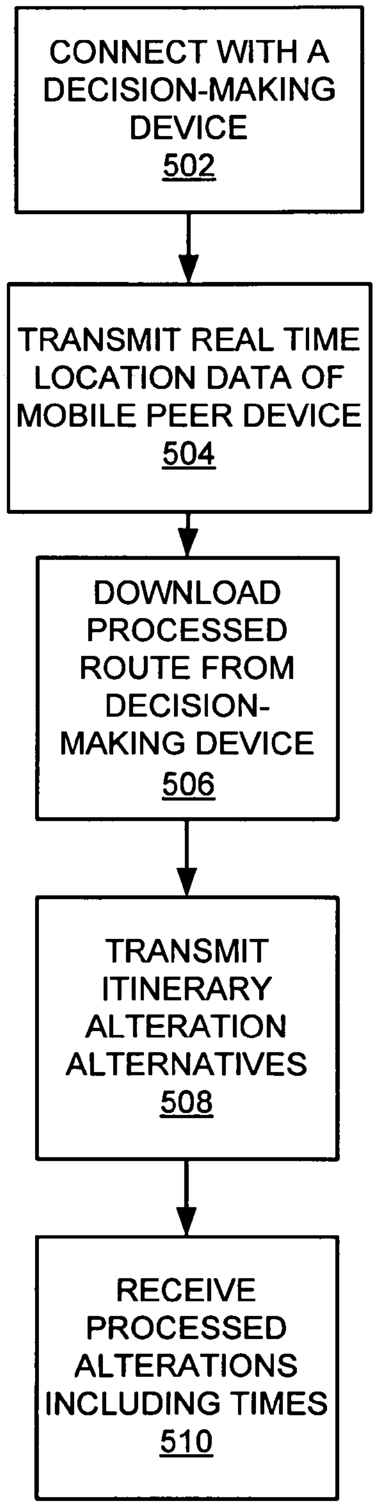
FIG. 5 is a flow diagram illustrating a method in accordance with an embodiment of the subject matter of the present application.

Referring now to FIG. 5, a flow diagram illustrates a method in accordance with an embodiment for a mobile peer device. Block 502 provides for connecting with a decision-making device. The decision-making device can be a server, such as server 210. Alternatively, the decision-making device can be one of the mobile peer devices 220 or a combination of the mobile peer devices 220, as described above with reference to FIG. 3. Block 504 provides for transmitting real-time location data of the mobile peer device. The transmitting of location data could be set up automatically on a periodic basis or be provided upon user discretion.

Block 506 provides for downloading processed routing data from a decision-making device, such as a server 210, a mobile peer device 220 or another source. The downloading can be automatic, as determined by the decision-making device, such as server 210, or upon request of a user. In one embodiment, for example, the mobile peer device functions in a theme park setting or other closed environment, such as a cruise ship, entertainment facility or the like. In such environments, the mobile peer device would be provided to guests of the environment. Guests that are participating in the closed environment as a group could be provided with the mobile peer devices upon entry, at which time routing data from the decision-making device would be provided to each mobile peer device. The routing could be entirely chosen by the decision-making device in accordance with environment parameters.

Block 508 provides for transmitting itinerary alteration alternatives. For example, if the mobile peer devices are provided in a setting that would allow for guests to provide feedback to the server, decision-making device or to a mesh network for processing, the mobile peer devices could be configured to transmit data to the server, decision-making device or other network from each mobile peer device or one of a group of mobile peer devices. More specifically, if a group of users have mobile peer devices that include a map of the environment and the group has identified a priority with respect to locations to be visited, a list of such locations in order of priority can be provided to the decision-making device for taking into account prior to determining a routing.

After processing the order of priority of locations within the environment, Block 510 provides for receiving processed alterations including times associated with the processed alterations. The alterations can include on-the-fly alterations caused by a group of mobile peer devices requiring a change in their routing.

Figure 6:
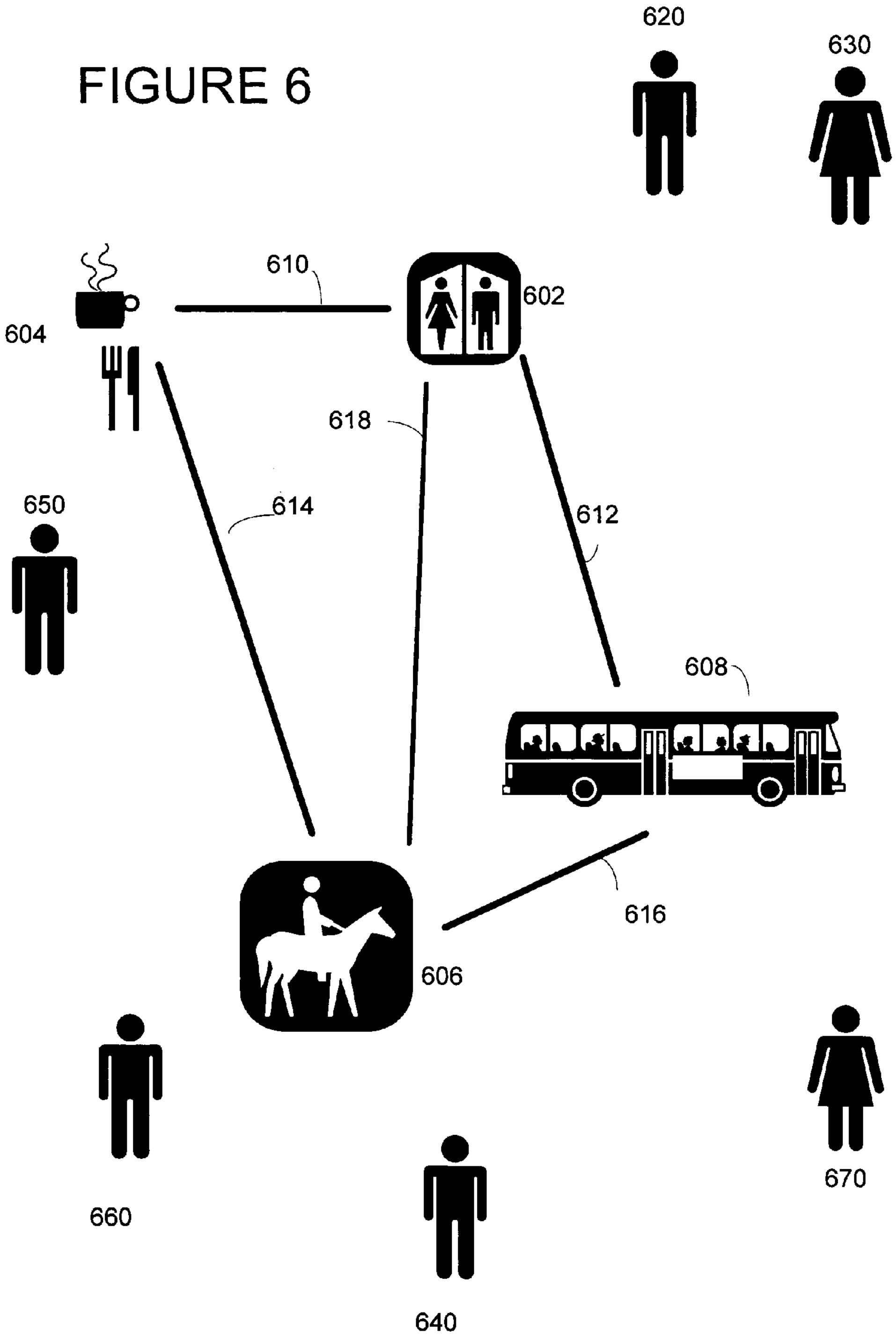
FIG. 6 is a block diagram illustrating how peer devices and goal-oriented instructions could be implemented in accordance with an embodiment of the subject matter of the present application.

Referring now to FIG. 6, an embodiment is directed to providing goal-oriented instructions via the mobile peer devices. FIG. 6 is a diagram illustrating how the mobile peer devices could be implemented in a theme park or other predetermined area. As shown, a park or other area could include locations of interest to users of the peer devices, such as a restroom 602, a coffee/dining location 604, a horseback riding location 606 and a transportation area 608. The locations of interest could have alternate paths available to the users of the peer devices. The paths are illustrated by paths 610, 612, 614, 616 and 618. Mobile peer devices could be used by individuals or groups of individuals shown as 620, 630, 640, 650, 660 and 670. In an embodiment, each of individuals 620-670 could be in a same group of individuals that would like to be provided with routing based on their individual and group goals. For example, the group may need to meet at the bus 608 for transportation out of a theme park by 5:00 pm. Other than that goal, each individual could prefer to avoid other members of the group or prefer to experience the park as sub-groups. For example, if the group included individuals all on a same tour, and the tour group included several couples, such as couple 620 and 630, the couples could be identified as a sub-group. Although all members would be required to meet at 5:00 pm, each sub-group could have a different itinerary except for the 5:00 pm meeting. The routing for the group could be processed to take the sub-groupings into account.

The processing of a decision-making device, such as a server, could take into account current location data of each individual of a group to enable meetings during a specified time period at a specific location. As described above, if a group would have to meet at 5:00 pm at bus 608, a routing that enabled the 5:00 pm meeting would direct individuals to take a shortest path to the bus 608 while considering other locations of interest to the individuals based on the individual's current location. Thus, for example, if individuals 620 and 630 are leaving bathrooms 602, and their itinerary has them having coffee at location 604, and having a horseback ride at location 606. The order of the visits could automatically route them to the location 606 closest to bus 608 as a final location prior to the 5:00 pm meeting time. Conversely, if individuals 620 and 630 transmit to server 210 a desire to go horseback riding twice with having a meal at location 604 in between but the server determines that such an itinerary would be impossible if the 5:00 pm meeting at the bus were identified as paramount, an alternative itinerary, error message or the like would be provided to their mobile peer devices. Similarly, if the decision-making device discovers that individuals 620 and 630 have detoured from a previously provided routing, a message, alternative itinerary or the like could be provided. For example, if individual 620 requires use of bathroom 602 and is unable to meet for horseback riding 606 at a designated time, his itinerary and those in his sub-group could be configured to automatically reschedule activities to insure that the 5:00 pm meeting at the bus 608 is kept on schedule. Additionally, if server 210 receives data indicating that individuals in a group will not be capable of meeting at a given location at a predetermined time, the server can broadcast to the group the times that the individuals will be capable of meeting. For example, individual 660, 650 and 670 are at different locations. Each is a different distance from bus 608. 670 is closest to the bus and 660 is farthest from bus 608. At 4:45 pm, the decision-making device, such as server 210, could determine that individual 660 will not arrive at bus 608 by 5:00 pm. Rather than provide an alternate itinerary, the decision-making device, such as server 210, broadcasts the time at which individual 660 is expected to arrive at bus 608 so that the group will know how long the wait for individual 660 will be.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet are incorporated herein by reference, in their entireties, to the extent that such texts/drawings are not inconsistent herewith.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While the present subject matter has been shown and described with reference to particular embodiments thereof, it will be understood by those skilled in the art that the foregoing and other changes in form and detail may be made therein without departing from the spirit and scope of the present subject matter, including but not limited to additional, less or modified elements and/or additional, less or modified steps performed in the same or a different order.

We claim:

1. A computer program product comprising computer readable storage media embedded with instructions for directing a mobile peer device to perform one or more acts comprising:

connecting with a decision-making device;

transmitting real-time location data of the mobile peer device to the decision-making device;

downloading a route from the decision-making device, the route determined from the real-time location data of the mobile peer device and from real-time location data of at least one or more other mobile peer devices;

displaying instructions for enabling the mobile peer device to meet a predetermined individual goal in accordance with an itinerary;

displaying instructions for enabling the mobile peer device to meet a predetermined group goal in accordance with the itinerary, the predetermined group goal differing at least in part from the predetermined individual goal;

identifying one or more itinerary alteration alternatives in a transmission to the decision-making device; and receiving from the decision-making device one or more processed itinerary alterations, the one or more processed itinerary alterations providing one or more alternatives to the itinerary.

2. The computer program product of claim 1 further comprising:

wirelessly downloading the route to the mobile peer device and to the at least one or more other mobile peer devices.

3. The computer program product of claim 1 wherein the downloading the route from the decision-making device includes:

downloading the route to the at least one or more other mobile peer devices which include one or more of electronic mapping devices, electronic personal assistants, cellular phones, pagers and/or computing devices.

4. The computer program product of claim 1 wherein the identifying one or more itinerary alteration alternatives includes:

identifying an itinerary alteration alternative that includes one or more projected times for an event described in the itinerary.

5. The computer program product of claim 1 further comprising:

identifying a priority associated with the itinerary, wherein at least two or more predetermined individual or group goals are identified in order of importance.

6. The computer program product of claim 1 wherein the displaying instructions for enabling the mobile peer device to meet a predetermined individual or group goal includes:

displaying to the mobile peer device a map and/or directions for the route.

7. The computer program product of claim 1 wherein the connecting with the decision-making device includes:

connecting with a mesh network, the mesh network including each of the at least one or more other mobile peer devices, wherein one or more of the mobile peer devices operates as the decision-making device to direct the other mobile peer devices.

8. The computer program product of claim 1 wherein the predetermined group goal comprises one or more sub-group goals, each sub-group goal having an itinerary which is different in part and shared in part with itineraries of the other sub-groups.

9. A method for a mobile peer device to receive a routing in real time to provide a route for the mobile peer device to follow an itinerary, the method comprising:

connecting with a decision-making device;

transmitting real-time location data of the mobile peer device to the decision-making device;

downloading the route from the decision-making device, the route determined from the real-time location data of the mobile peer device and from real-time location data of at least one or more other mobile peer devices;

displaying instructions for enabling the mobile peer device to meet a predetermined individual goal in accordance with the itinerary;

displaying instructions for enabling the mobile peer device to meet a predetermined group goal in accordance with the itinerary, the predetermined group goal differing at least in part from the predetermined individual goal;

identifying one or more itinerary alteration alternatives in a transmission to the decision-making device; and receiving from the decision-making device one or more processed itinerary alterations, the one or more processed itinerary alterations providing one or more alternatives to the itinerary.

10. The method of claim 9 wherein the identifying one or more itinerary alteration alternatives includes:

identifying at least one itinerary alteration alternative to the predetermined group goal that includes a location at which the at least one or more other mobile peer devices could meet the mobile peer device.

11. The method of claim 9 further comprising:

performing peer negotiation between the mobile peer device and the at least one or more other mobile peer devices to determine the itinerary.

12. The method of claim 9 wherein the identifying one or more itinerary alteration alternatives includes:

identifying a predetermined individual or group goal that includes one or more projected times for a location described in the itinerary.

13. The method of claim 9 wherein the identifying one or more itinerary alteration alternatives includes:

identifying one or more alternate itineraries with the predetermined individual or predetermined group goal of a time at which the at least one or more other mobile peer devices could meet with the mobile peer device.

14. The method of claim 9 wherein the connecting with the decision-making device includes:

connecting with the decision-making device, wherein the decision-making device comprises a server or at least one or more other mobile peer devices.

15. The method of claim 9 further comprising:

updating the route based on real-time location data received from the at least one or more other mobile peer devices; and downloading an updated route from the decision-making device to the mobile peer device and to the at least one or more other mobile peer devices.

16. The method of claim 9 wherein the connecting with the decision-making device includes:

connecting with a designated mobile peer device of the least one or more other mobile peer devices, the designated mobile peer device acting as a server to the other mobile peer devices.

17. The method of claim 9 wherein the connecting with the decision-making device includes:

connecting with a mesh network, the mesh network including each of the at least one or more other mobile peer devices, wherein one or more of the mobile peer devices operates as the decision-making device to direct the other mobile peer devices.

18. The method of claim 9 wherein the displaying the instructions for enabling the mobile peer device to meet the predetermined individual or group goal in accordance with the itinerary includes:

enabling a user of the mobile peer device to alter the itinerary on the fly.

19. The method of claim 9 further comprising:

broadcasting the route to the at least one or more other mobile peer devices via one or more of a wireless local area network (WLAN), a cellular system, a global positioning system (GPS), a radio frequency system, an infrared system, an IEEE 802.11 system, and/or a wireless Bluetooth system.

20. The method of claim 9 wherein the downloading the route from the decision-making device includes:

downloading the route to the mobile peer device via one or more of a wireless local area network (WLAN), a cellular system, a global positioning system (GPS), a radio frequency system, an infrared system, an IEEE 802.11 system, and/or a wireless Bluetooth system.

21. The method of claim 9 wherein the downloading the route from the decision-making device includes:

downloading the route to one of the following type of mobile peer device: electronic mapping device, electronic personal assistant, cellular phone, pager, and/or computing device.

22. The method of claim 9 wherein the displaying instructions for enabling the mobile peer device to meet a predetermined individual or group goal includes:

displaying to the mobile peer device a map and/or directions for the route.

23. The method of claim 9 further comprising:

downloading to the at least one or more other mobile peer devices a map and/or directions for the route.

24. The method of claim 9 further comprising:

providing a transmission to the decision-making device to identify a priority associated with the itinerary, wherein at least two or more predetermined individual or group goals are identified in order of importance.

25. The method of claim 9 wherein the identifying one or more itinerary alteration alternatives includes:

identifying a predetermined individual or group goal that includes one or more projected times for an event described in the itinerary.

26. The method of claim 9 wherein the predetermined group goal comprises one or more sub-group goals, each sub-group goal having an itinerary which is different in part and shared in part with itineraries of the other sub-groups.

27. A computer system comprising:

a processor;

a memory coupled to the processor, the memory including:

a module configured to enable a connection with a decision-making device; and a module configured to identify one or more itinerary alteration alternatives in a transmission to the decision-making device; and a transmitter coupled to the processor operable to transmit real-time location data of the mobile peer device to the decision-making device, the transmitter operable to receive from the decision-making device one or more processed itinerary alterations, the one or more processed itinerary alterations providing one or more alternatives to the itinerary;

a data store coupled to the processor, the data store operable to receive a route from the decision-making device, the route determined from the real-time location data of the mobile peer device and from real-time location data of at least one or more other mobile peer devices; and a display coupled to the processor, the display configured to display instructions to enable the mobile peer device to meet a predetermined individual goal in accordance with the itinerary, the display further configured to display instructions to enable the mobile peer device to meet a predetermined group goal in accordance with the itinerary, the predetermined group goal differing at least in part from the predetermined individual goal.

28. The computer system of claim 27 wherein the transmitter is further configured to enable a connection with a mesh network, the mesh network including each of the at least one or more other mobile peer devices, wherein one or more of the mobile peer devices operates as the decision-making device to direct the other mobile peer devices.

29. The computer system of claim 27 wherein the display is further configured to enable a user of the mobile peer device to alter the itinerary on the fly.

30. The computer system of claim 27 wherein the predetermined group goal comprises one or more sub-group goals, each sub-group goal having an itinerary which is different in part and shared in part with itineraries of the other sub-groups.

31. The computer system of claim 27 wherein the module configured to identify one or more itinerary alteration alternatives is further configured to identify a predetermined individual or group goal that includes one or more projected times for an event described in the itinerary.

* * * * *